No. 788,116. PATENTED APR. 25, 1905.
E. NYLÉN.
LINER FOR CENTRIFUGAL SEPARATORS.
APPLICATION FILED JUNE 16, 1904.
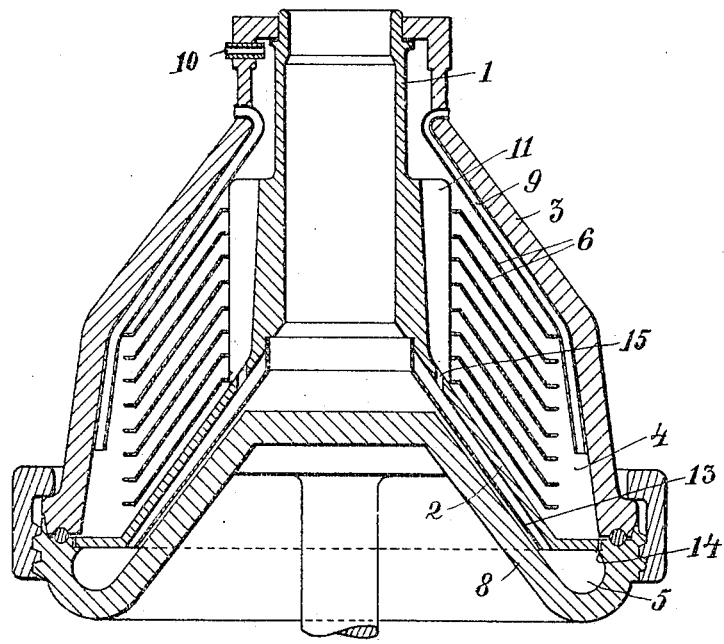
Witnesses
Inventor No. 788,116. Patented April 25, 1905.

UNITED STATES PATENT OFFICE.

ERIK NYLÉN, OF STOCKSUND, SWEDEN.

LINER FOR CENTRIFUGAL SEPARATORS.

SPECIFICATION forming part of Letters Patent No. 788,116, dated April 25, 1905.

Application filed June 16, 1904. Serial No. 212,857.

*To all whom it may concern:*

Be it known that I, ERIK NYLÉN, a subject of the King of Sweden and Norway, and a resident of Stocksund, Sweden, have invented new and useful Improvements in Liners for Centrifugal Separators, of which the following is a specification, reference being had to the drawing accompanying and forming a part hereof.

This invention relates to improvements in liners for centrifugal separators.

The object of the invention is to subject the milk or the other liquid to be separated to a preliminary treatment which will facilitate the usual separation process.

The invention consists in the combination, with a centrifugal-separator bowl having discharging devices for the blue milk and the cream, of a central inlet-pipe, a funnel-shaped portion on the latter provided with a number of holes and dividing the bowl in an upper and a lower chamber, a liner in the said upper chamber, and a funnel in the said lower chamber dividing the latter in two parts. By this device the full milk will be subjected to the centrifugal force during a comparatively long time before entering the liner, and trials have proved that such preliminary treatment of the full milk is very favorable for the separation and accelerates the same.

In the accompanying drawing I have shown a liner embodying my invention.

The figure shows a vertical section of a centrifugal-separator bowl and a liner constructed in accordance with the present invention.

Referring to the drawing, the central inlet-pipe 1 is at the lower end provided with a funnel-shaped portion 2, dividing the bowl 3 in two chambers 4 and 5, the upper of which constitutes the usual separation-space and is provided with a liner 6, consisting in well-known manner of conical ring-shaped plates superposed on one another. The said funnel-shaped portion tightens against an inwardly-projecting flange 14 on the bottom 8 of the bowl. In the lower chamber 5 is provided a funnel 13, dividing the said chamber in two parts. The funnel-shaped portion of the central inlet-pipe 1 is provided with openings 15, through which the full milk will rise along flanges 11 on the central inlet-pipe. The said holes may preferably be arranged in such radial distance from the center of the bowl as to lead out the full milk outside the wall of cream obtained in the separation process in order not to disturb the said wall of cream.

The devices now described work as follows: The full milk led into the central inlet-pipe will be thrown out into the space between the funnel 13 and the bottom 8 of the bowl and will thereupon, inasmuch as the funnel-shaped portion 2 of the central inlet-pipe tightens against the inwardly-projecting flange 14 on the bottom 8, flow inward between the said funnel 13 and the funnel-shaped portion 2 of the central inlet-pipe, whereupon the milk will rise through the holes 15 and enter the liner, in which it will be separated in the usual manner. The blue milk will leave the bowl through tubes 9, while the cream will be thrown out through the usual cream-outlet 10.

Having now described my invention and in what manner the same may be performed, what I claim as new, and desire to secure by Letters Patent, is—

The combination with a centrifugal-separator bowl having discharging devices for the blue milk and the cream, of a central inlet-pipe, a funnel-shaped portion on the latter provided with a number of holes and dividing the bowl in an upper and a lower chamber, a liner in the said upper chamber, and a funnel in the said lower chamber dividing the latter in two parts, substantially as and for the purpose set forth.

In testimony whereof I have signed my name to this specification in the presence of two subscribing witnesses.

ERIK NYLÉN.

Witnesses:
GERDA LINDKIRST,
JOHN DELMAR.